United States Patent
Murase

(10) Patent No.: US 10,377,242 B2
(45) Date of Patent: Aug. 13, 2019

(54) REGENERATIVE BRAKE CONTROL DEVICE

(71) Applicant: MITSUBISHI JIDOSHA KOGYO KABUSHIKI KAISHA, Tokyo (JP)

(72) Inventor: Masahiro Murase, Kariya (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 130 days.

(21) Appl. No.: 15/280,019

(22) Filed: Sep. 29, 2016

(65) Prior Publication Data

US 2017/0087992 A1 Mar. 30, 2017

(30) Foreign Application Priority Data

Sep. 30, 2015 (JP) .................................. 2015-194302

(51) Int. Cl.
*B60L 7/18* (2006.01)
*B60L 15/20* (2006.01)

(52) U.S. Cl.
CPC ............. *B60L 7/18* (2013.01); *B60L 15/2009* (2013.01); *B60L 15/2045* (2013.01);
(Continued)

(58) Field of Classification Search
CPC .... B60L 7/18; B60L 15/2009; B60L 2250/26; B60L 15/2045; B60L 15/224;
(Continued)

(56) References Cited

U.S. PATENT DOCUMENTS 5,839,533 A * 11/1998 Mikami ................. B60K 6/365
180/165
5,915,801 A * 6/1999 Taga ....................... B60K 6/48
303/152

(Continued)

FOREIGN PATENT DOCUMENTS

CN 103895519 A 7/2014
CN 104246314 A 12/2014
(Continued)

OTHER PUBLICATIONS

Office Action dated Jan. 25, 2018 in corresponding European Patent Application No. 16 191 583.0.
(Continued)

*Primary Examiner* — Pamela Rodriguez
(74) *Attorney, Agent, or Firm* — Birch, Stewart, Kolasch & Birch, LLP

(57) ABSTRACT

A regenerative brake control device of a vehicle, which is configured to control a rotary electric motor that is configured to drive wheels at a regeneration ratio corresponding to a selected regeneration stage to thereby obtain a regenerative brake force, includes: a selecting section which is manually operated to select a regeneration stage from a plurality of regeneration stages which have been set; and a control section which is configured to make control so that, when a predetermined operation is performed on the selecting section, a regeneration stage in which the predetermined operation has not been performed on the selecting section is automatically changed to another regeneration stage.

19 Claims, 7 Drawing Sheets

(52) U.S. Cl.
CPC ..... *B60L 2240/423* (2013.01); *B60L 2250/24* (2013.01); *B60L 2250/26* (2013.01); *Y02T 10/645* (2013.01); *Y02T 10/72* (2013.01); *Y02T 10/7283* (2013.01)

(58) Field of Classification Search
CPC ............... B60L 15/423; B60L 2250/24; B60L 2240/423; B60L 10/7283; B60L 10/645; B60L 10/72
USPC .......................................................... 303/152
See application file for complete search history.

(56) References Cited

U.S. PATENT DOCUMENTS

| | | | |
|---|---|---|---|
| 6,033,041 A * | 3/2000 | Koga | B60L 7/12 |
| | | | 188/159 |
| 6,232,729 B1 * | 5/2001 | Inoue | B60L 11/1851 |
| | | | 318/139 |
| 6,459,980 B1 | 10/2002 | Tabata et al. | |
| 9,139,106 B2 * | 9/2015 | Saitoh | B60W 10/11 |
| 2010/0076657 A1 * | 3/2010 | Jinno | B60W 10/24 |
| | | | 701/70 |
| 2012/0169256 A1 | 7/2012 | Suda et al. | |
| 2014/0180518 A1 * | 6/2014 | Hayashi | B60L 15/2009 |
| | | | 701/22 |
| 2017/0021729 A1 * | 1/2017 | Murase | B60L 3/0015 |
| 2017/0036547 A1 * | 2/2017 | Mizui | B60L 7/14 |
| 2017/0267122 A1 * | 9/2017 | Mitsuoka | B60L 15/2045 |
| 2017/0282926 A1 * | 10/2017 | Hashizaka | B60L 7/14 |

FOREIGN PATENT DOCUMENTS

| | | |
|---|---|---|
| CN | 106364331 A | 2/2017 |
| CN | 106394256 A | 2/2017 |
| EP | 2 749 446 A2 | 7/2014 |
| EP | 3 121 055 A1 | 1/2017 |
| EP | 3 127 736 A1 | 2/2017 |
| JP | 2005-168283 A | 6/2005 |
| JP | 2007-151397 A | 6/2007 |
| JP | 2012-139801 A | 7/2012 |
| JP | 2013-253616 A | 12/2013 |
| JP | 2014-128075 A | 7/2014 |

OTHER PUBLICATIONS

Chinese Office Action and Search Report, dated Sep. 25, 2018, for Chinese Application No. 201610865360.7, with English translations.

Notice of Reasons for Refusal issued in corresponding Japanese Application No. 2015-194302 dated May 15, 2019.

* cited by examiner

REGENERATIVE BRAKE CONTROL DEVICE

CROSS-REFERENCE TO RELATED APPLICATION(S)

This application is based upon and claims the benefit of priority from prior Japanese patent application No. 2015-194302, filed on Sep. 30, 2015, the entire contents of which are incorporated herein by reference.

BACKGROUND

The present invention relates to a regenerative brake control device which regeneratively drives a rotary electric motor used for traveling to thereby obtain regenerative brake force.

There is available an electrically driven vehicle that travels using a rotary electric motor as a traveling power source. The rotary electric motor is driven by electric power charged into a battery. In this kind of electrically driven vehicle, the rotary electric motor is regeneratively driven during deceleration to obtain regenerative brake force. In addition, kinetic energy of the vehicle is recovered as electric energy into the battery due to regenerative power generation. From the viewpoint of energy efficiency, it is preferable that a regeneration amount (regeneration ratio) serving as the regenerative brake force is set so high that a large amount of the regenerative power generation can be obtained. On the other hand, due to increase in deceleration, an adverse influence on drivability increases. Thus, the regenerative brake force during deceleration is necessarily set in consideration of the energy efficiency or the drivability. Therefore, according to some device, a selecting section can be operated to adjust and increase/decrease a regeneration amount (regenerative brake power) to thereby make it possible to control a deceleration state. For example, in JP-A-2005-168283, the regeneration amount (regenerative brake power) is changed in accordance with an operation time on the selecting section.

To adjust the regeneration amount of the regenerative brake force, the driver performs an operation on the selecting section. The operation is defined uniquely in advance. Due to the operation, a regeneration stage which can obtain a desired regeneration amount (regenerative brake force) is selected from regeneration stages among which there is a difference in regeneration amount. Therefore, it takes some time to obtain a deceleration feeling corresponding to the regeneration amount requested by the driver. Accordingly, there is room for improvement in operability. In addition, in the configuration according to JP-A-2005-168283, the regeneration amount is changed in accordance with the operation time on the selecting section. Accordingly, the operation time is required to obtain the deceleration feeling corresponding to the regeneration amount requested by the driver.

SUMMARY

It is therefore an object of the invention to improve operability in adjusting a regeneration amount for obtaining desired regenerative brake force, to thereby improve drivability.

In order to achieve the object, according to the invention, there is provided a regenerative brake control device of a vehicle, the regenerative brake control device which is configured to control a rotary electric motor that is configured to drive wheels at a regeneration ratio corresponding to a selected regeneration stage to thereby obtain a regenerative brake force, the regenerative brake control device comprising: a selecting section which is manually operated to select a regeneration stage from a plurality of regeneration stages which have been set; and a control section which is configured to make control so that, when a predetermined operation is performed on the selecting section, a regeneration stage in which the predetermined operation has not been performed on the selecting section is automatically changed to another regeneration stage.

DETAILED DESCRIPTION OF EXEMPLARY EMBODIMENTS

Embodiments of the invention will be described below with reference to the drawings. In the embodiments, the same members or members having the same functions will be referred to by the same signs respectively and correspondingly, and duplicate description thereof will be omitted suitably. Incidentally, in consideration of easiness to view the drawings, constituent requirements may be omitted or broken partially for description on some occasions.

In each of the embodiments, in a regenerative brake control device in which a selecting section is manually operated to change a regeneration ratio of regenerative brake force, a predetermined operation different from a normal regeneration ratio changing operation is performed at least once so that a current regeneration stage can be automatically changed to a target regeneration stage to change the regeneration ratio with a different pattern from that during the normal regeneration ratio changing operation. Hereinafter, the current regeneration stage will be used as a regeneration stage immediately before the predetermined operation is performed on the selecting section.

Figure 1:
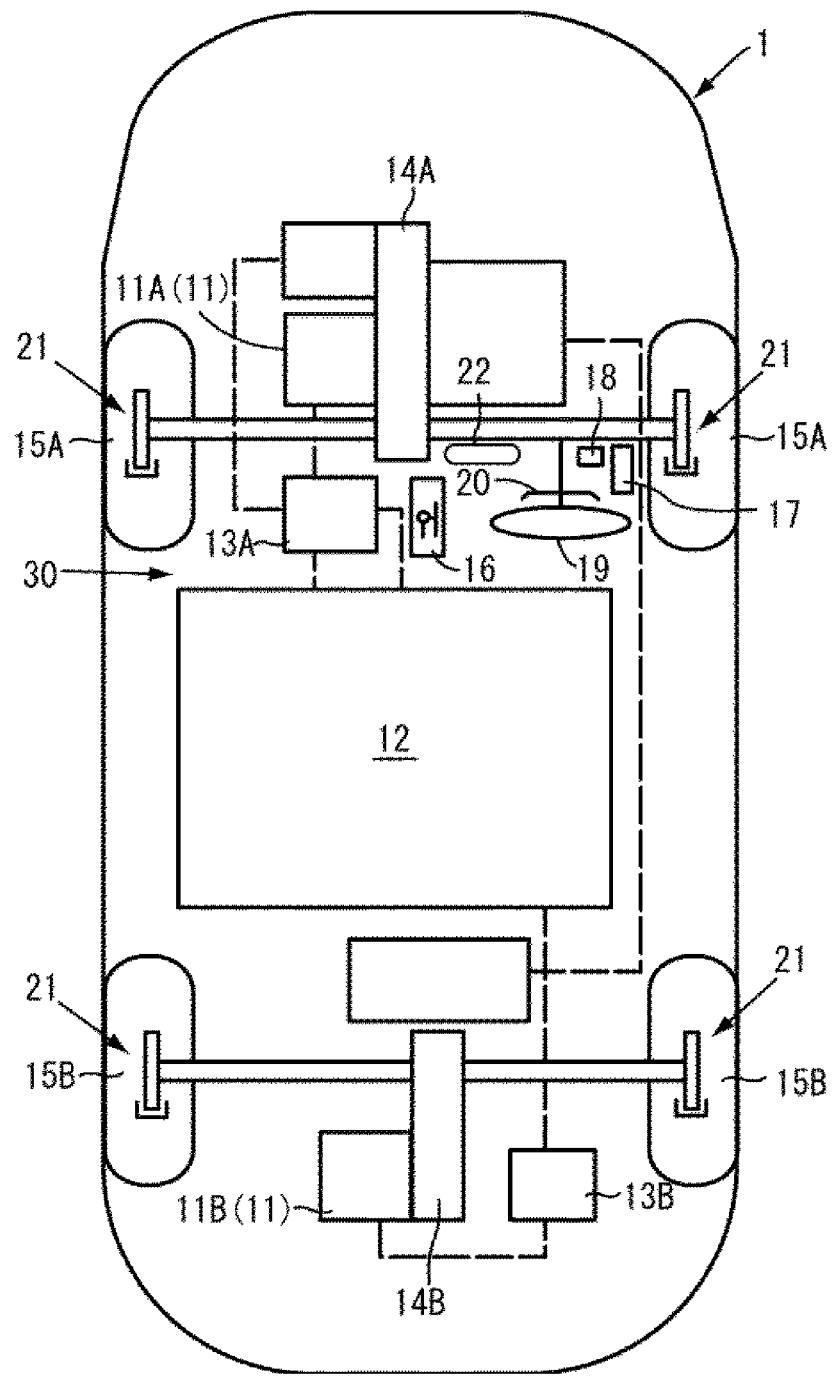
FIG. 1 is an outline diagram showing an overall configuration of a vehicle in which a regenerative brake control device according to an embodiment of the invention is mounted.

FIG. 1 is an outline diagram showing an overall configuration of an electrically driven vehicle 1 in which a regenerative brake control device 30 according to an embodiment of the invention is mounted. A front motor 11A and a rear motor 11B which are rotary electric motors serving as traveling power sources are disposed on a front side and a rear side respectively in the vehicle 1. A battery 12 is mounted in the vehicle 1. DC power is preliminarily charged into the battery 12. Electric power can be charged into the battery 12 from a power source device outside the vehicle. Electric power discharged from the battery 12 is converted into AC power by a front inverter 13A and a rear inverter 13B, and then supplied to the front motor 11A and the rear motor 11B respectively. Motive mower outputted from the front motor 11A is transmitted to left and right front driving wheels 15A respectively through a front transaxle 14A. Motive power outputted from the rear motor 11B is transmitted to left and right rear driving wheels 15B respectively through a rear transaxle 14B.

When the front motor 11A and the rear motor 11B are termed generically, they are referred to as "motors 11". When the front inverter 13A and the rear inverter 13B are termed generically, they are referred to as "inverters 13". When the front driving wheels 15A and the rear driving wheels 15B are termed generically, they are referred to as "driving wheels 15". When the vehicle 1 is decelerated or the vehicle 1 is traveling on a downhill slope etc. with its accelerator off, the motors 11 are regeneratively driven to function as power generators. Even when regeneration operation is performed, the motors 11 are driven regeneratively to function as power generators. During the regenerative driving in which the motors 11 are operated to regenerate energy, regeneration operation (regenerative brake) is given to generate a brake feeling, while kinetic energy is recovered as electric energy into the battery 12. In the regenerative driving of the motors 11, AC power is generated and converted into DC power by the inverters 13 respectively, and then charged into the battery 12. In this manner, the kinetic energy is recovered as the electric energy into the battery 12 due to the regenerative driving of the motors 11 in the vehicle 1. Accordingly, the energy can be used effectively. The magnitude of the regenerative brake force of the motors 11 can be changed by regenerative brake control.

The vehicle 1 is provided with a brake device 21 as a brake section which gives brake force to the driving wheels 15. An accelerator pedal 17 which controls vehicle speed and a brake pedal 18 which operates the brake device 21 are disposed at driver's feet in a driver's seat.

Figure 2:
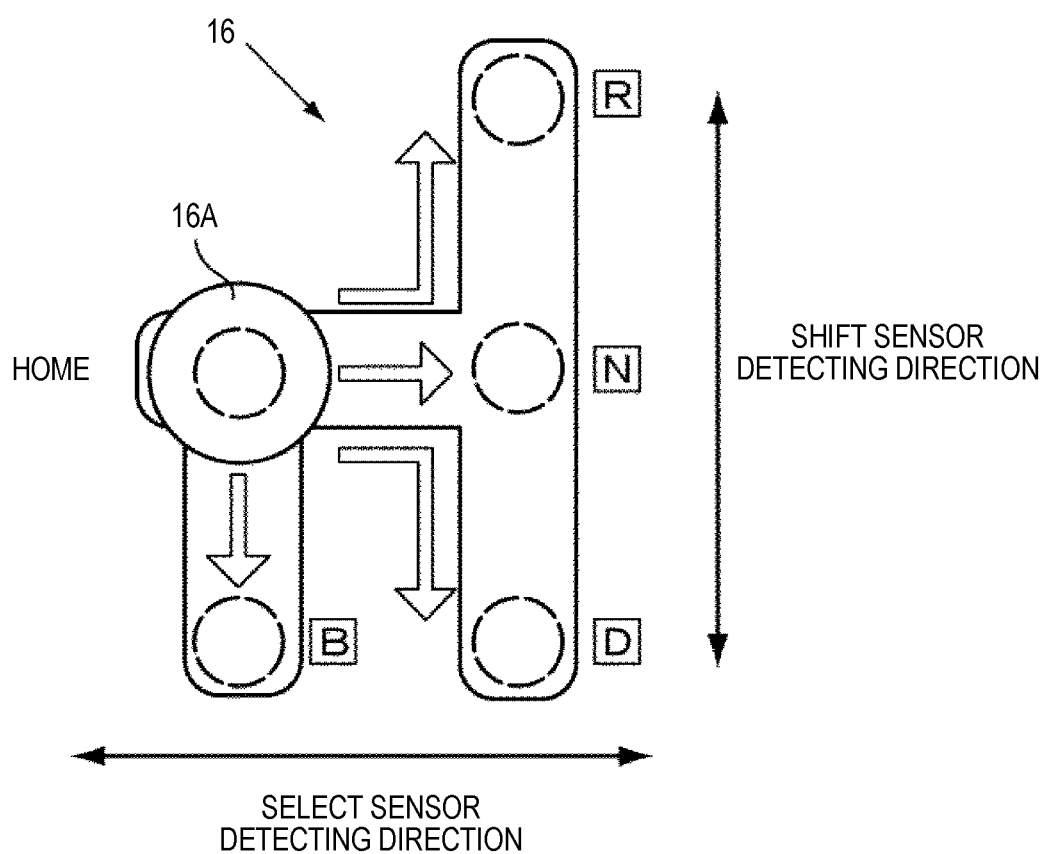
FIG. 2 is a schematic diagram in which a peripheral configuration of a shift lever provided in a driver's seat of the vehicle is shown from right above.

A shift device 16 which can change a traveling mode in accordance with a driver's operation is provided in the driver's seat of the vehicle 1. FIG. 2 is a schematic diagram in which a peripheral configuration of the shift device 16 is shown from right above. The shift device 16 is provided with a shift lever 16A which is operated by the driver. The shift lever 16A is disposed at a home position as an initial state. The shift lever 16A is provided to be able to move from the home position toward the front, rear, left or right along arrows. The shift device 16 is configured to change over the mode to a corresponding traveling mode or regeneration mode when the driver changes the shift position of the shift lever 16A frontward, rearward, leftward or rightward along the arrows.

In FIG. 2, an N position indicated as N designates a neutral mode in which motive powers of the motors 11 are not transmitted to the driving wheels 15, a D position indicated as D designates a normal traveling mode in which motive powers of the motors 11 are transmitted to the driving wheels 15 to drive the driving wheels 15 forward, and an R position indicated as R designates a backward mode in which powers of the motors 11 are transmitted to the driving wheels 15 to drive the driving wheels 15 backward. A B position indicated as B designates a regeneration mode in which regenerative brake force of the motors 11 is changed stepwise during traveling (in the normal traveling mode). The shift device 16 has a configuration in which the shift lever 16A returns to the home position automatically when the driver releases the shift lever 16A after operating the shift lever 16A to the B position.

The operating state of the shift lever 16A is detected by a shift sensor and a select sensor which are provided in the shift device 16. The shift sensor outputs an operation state of the shift lever 16A in a front/rear-direction (an up/down direction in FIG. 2) as a voltage signal. The select sensor outputs an operation state of the shift lever 16A in a left/right-direction as a voltage signal. As will be described later, the regenerative brake control device 30 has a configuration in which, upon acquisition of such voltage signals outputted from the shift sensor and the select sensor, the regenerative brake control device 30 can grasp which position the shift lever 16A has been operated to.

Figure 3:
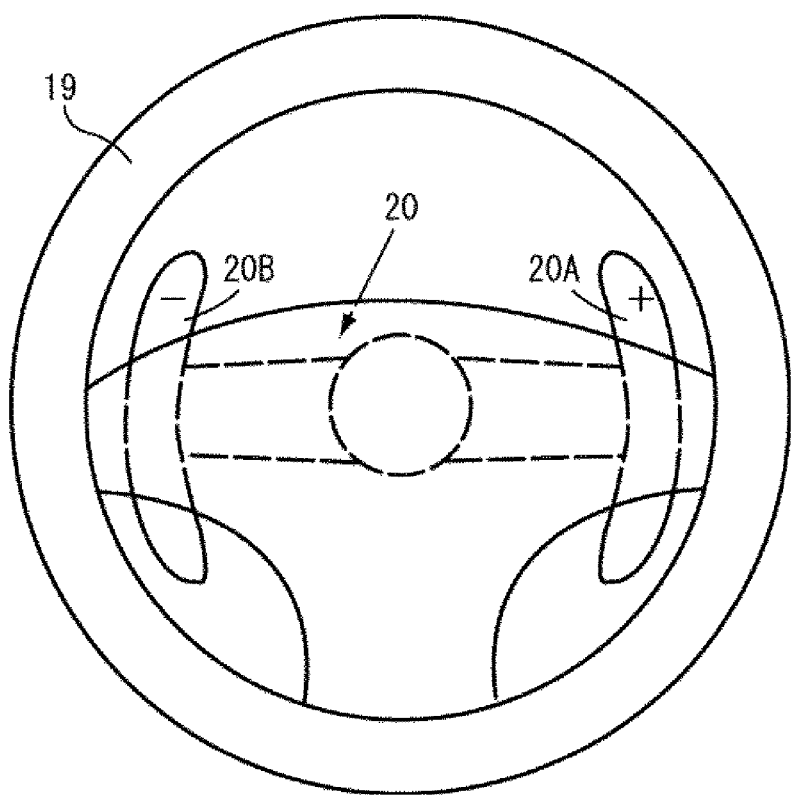
FIG. 3 is a schematic diagram showing a peripheral configuration of a paddle switch as an embodiment of a selecting section according to the invention.

FIG. 3 is a schematic diagram showing a peripheral configuration of a paddle switch 20 provided in a steering wheel 19 installed in the driver's seat of the vehicle 1. The paddle switch 20 is provided with a paddle plus switch part 20A and a paddle minus switch part 20B. The paddle plus switch part 20A can change a regeneration stage stepwise in a direction of decreasing regenerative brake force. The paddle minus switch part 20B can change the regeneration stage stepwise in a direction of increasing the regenerative brake force. The paddle switch 20 is a selecting section which can be operated in a state in which the driver is holding the steering wheel 19 in his/her hands. The paddle switch 20 is an electric switch which outputs an operation signal when the driver operates and pulls the paddle switch 20 toward a handle side (front side). The operation signal from the paddle switch 20 is outputted once whenever the paddle switch 20 is operated and pulled. From the operation signal, the regenerative brake control device 30 can grasp the operation state and the number of times of operation on the paddle switch 20.

Figure 4:
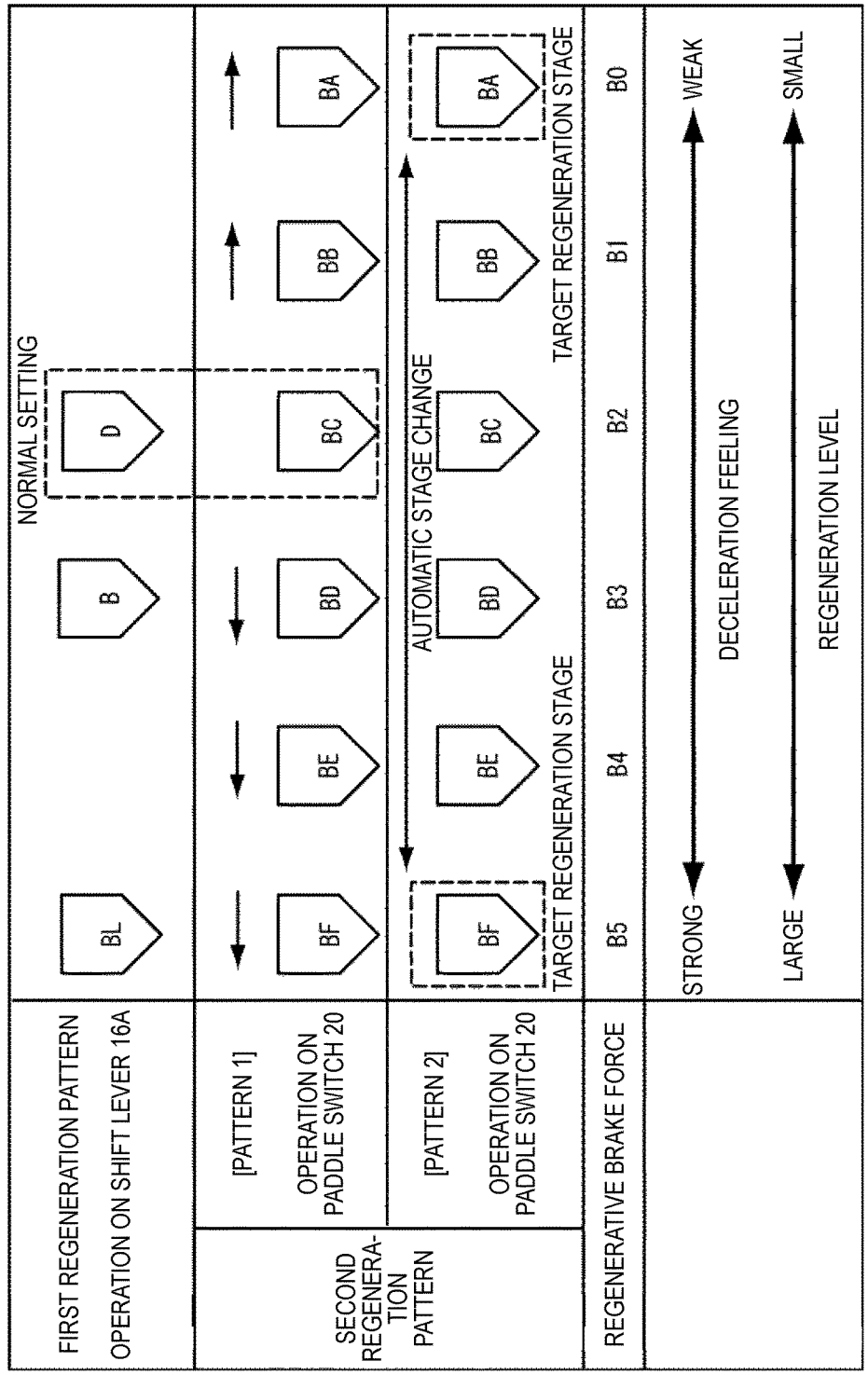
FIG. 4 is a conceptual diagram showing the relation between regenerative braking power and regeneration stages which can be set by the shift lever and the paddle switch.

FIG. 4 is a conceptual diagram showing the relation between regenerative brake force and regeneration stages which can be selected by the shift lever 16A and the paddle switch 20. Here, the regenerative brake force designates a regeneration ratio, and the regeneration ratio designates a regeneration amount obtained when measurement is made at constant speed. One is selected from six regeneration stages B0 to B5 based on the magnitude of the regenerative brake force of the motors 11. A series of regeneration stages which can be selected by the shift lever 16A are set collectively as a first regeneration pattern. A series of regeneration stages which can be selected by the paddle switch 20 is set collectively as a second regeneration pattern. The second regeneration pattern includes a pattern 1 performed by a normal regeneration ratio changing operation and a pattern 2 performed by a predetermined operation different from the normal regeneration ratio changing operation. That is, the pattern 2 performed by the predetermined operation is a third regeneration pattern. The normal regeneration ratio changing operation mentioned herein means an operation performed once on the paddle switch 20 within a predetermined time. That is, the normal regeneration ratio changing operation is an operation which is performed once on the paddle plus switch part 20A or the paddle minus switch part 20B. Configuration is made in such a manner that the current regeneration stage can be increased or decreased to another regeneration stage one by one whenever such a normal regeneration ratio changing operation is performed.

The predetermined operation means an operation which is performed a number of times continuously on the paddle switch 20 within the predetermined time. That is, the predetermined operation is an operation which is performed a number of times continuously on the paddle switch 20 in a shorter time than reference speed. In the embodiment, the predetermined operation means a "double-click operation" which is an operation performed twice continuously on the paddle plus switch part 20A or the paddle minus switch part 20B within the predetermined time. Configuration is made in such a manner that when the double-click operation is performed on the paddle switch 20, the current regeneration stage can be automatically changed to another regeneration stage in a direction of increasing the regenerative brake force or in a direction of decreasing the regenerative brake force in accordance with the operated switch.

The regenerative brake force is set to be stronger and to increase a driver's deceleration feeling or the regeneration stage as the regenerative brake force goes from B0 toward B5. The regenerative brake force (regeneration ratio) can be changed stepwise in accordance with the number of times of operation on the paddle switch 20 and the number of times of operation on the shift lever 16A to the B position. That is, the relation between the regenerative brake force (regeneration ratio) and each regeneration stage is set so that the brake force at a regeneration stage BA is smallest and becomes stronger toward a regeneration stage BF.

The first regeneration pattern which can be selected by the shift lever 16A includes regeneration stages D, B and BL. When the shift lever 16A is operated to the D position, the regeneration stage D can be selected. The regenerative brake force corresponds to B2 which is a default value. The shift lever 16A is operated once from the D position to the B position to be thereby shifted to the regeneration stage B having a regenerative brake force B3 which is set to be stronger than that of the regeneration stage D. The shift lever 16A is further operated once to the B position to be thereby shifted to the regeneration stage BL having a regenerative brake force B5 which is set to be stronger than that of the regeneration stage B.

In the embodiment, a change amount of the regeneration ratio from B3 to B5 is made larger than a change amount of the regeneration ratio from B2 to B3. Thus, the change amount of the regeneration ratio between regeneration stages which can be set by the shift lever 16A is set to be larger as the regeneration stages have higher regeneration ratios. Accordingly, even when the regeneration amount is changed largely, the regeneration amount (regenerative brake force) desired by the driver can be obtained rapidly by an operation on the shift lever 16A.

In addition, in comparison with the paddle switch 20, the shift lever 16A is set to have a smaller number of regeneration stages, and to have a smaller number of times of operation for setting a desired regeneration stage. Therefore, the number of times of shift operation on the shift lever 16A for obtaining a regeneration amount is smaller than that on the paddle switch 20 for obtaining the same regeneration amount. Accordingly, the increase/decrease of the regenerative brake force can be easily controlled with the smaller number of times of operation on the shift lever 16A. Thus, the shift lever 16A is suitable for reducing an operation burden on the driver.

The pattern 1 of the second regeneration pattern which can be selected by the paddle switch 20 includes regeneration stages BA, BB, BC, BD, BE and BF. The number of regeneration stages in the pattern 1 of the second regeneration pattern is larger than that in the first regeneration pattern. The regeneration stages BA, BB, BC, BD, BE and BF correspond to the regenerative brake forces B0, B1, B2, B3, B4 and B5 respectively. The regeneration stages BA, BB, BC, BD, BE and BF can be shifted from one to another one by one in response to an operation on the paddle plus switch part 20A or the paddle minus switch part 20B. In the embodiment, the regeneration stage BA indicates the smallest value and the regeneration stage BF indicates the largest value.

The change amounts of the regeneration ratios among the regeneration stages B0 to B5 may be made equivalent to one another. When the change amounts of the regeneration ratios among the regeneration stages which can be selected by the paddle switch 20 are set thus to be equivalent to one another, the regeneration amount (regenerative brake force) can be increased/decreased stepwise so that fine regeneration control can be made. That is, in the embodiment, a plurality of regeneration stages and a plurality of regeneration ratios are set.

In addition, the paddle switch 20 is set to have a larger number of regeneration stages than the shift lever 16A, and to have a larger number of times of operation for selecting a desired regeneration stage. Therefore, the paddle switch 20 is suitable for fine control of the regenerative brake force.

The pattern 2 of the second regeneration pattern which can be selected by the paddle switch 20 is set so that the current regeneration stage is changed automatically stepwise to one of target regeneration stages when a double-click operation as a predetermined operation is performed on the paddle switch 20. The target regeneration stages mean the regeneration stage BF corresponding to the largest regenerative brake force B5, and the regeneration stage BA corresponding to the smallest regenerative brake force B0 here. That is, when the double-click operation is performed on the paddle plus switch part 20A, the regeneration stage during the operation is changed to the regeneration stage BA automatically stepwise. When the double-click operation is performed on the paddle minus switch part 20B, the regeneration stage during the operation is changed to the regeneration stage BF automatically stepwise.

In addition, in the embodiment, the automatic stage change speed of the regeneration stage is changed in accordance with the state of the vehicle 1 when the pattern 2 is selected by the paddle switch 20. Control of the automatic stage change speed will be described later.

In the embodiment, when an operation different from the double-click operation is performed on the paddle switch 20, control for changing the automatic stage change speed of the regeneration stage is cancelled. For example, assume that the double-click operation has been performed on the paddle switch 20 to set the regeneration mode at the pattern 2. When the paddle switch 20 is operated and pulled toward the front for a longer time than that for a normal operation in this case, control for changing the automatic stage change speed of the regeneration stage is cancelled and the vehicle turns into a D range travelling state. On the other hand, assume that the shift lever 16A has been operated to set the regeneration mode at the first regeneration pattern. When the paddle switch 20 is operated and pulled toward the front for a longer time than that for a normal operation in this case, the regeneration mode is cancelled and the vehicle turns into the D range traveling state. Setting in the embodiment is made in such a manner that when regenerative brake prohibiting conditions are established, the regeneration mode is canceled and the vehicle turns into the D range traveling state.

Thus, the shift lever 16A and the paddle switch 20 are provided to have different numbers of times of operation for selecting a desired regeneration stage. Accordingly, the regenerative brake force can be controlled following the driver's intention in accordance with the traveling state. The number of times of operation on the shift lever 16A for obtaining a regeneration amount is smaller than that on the paddle switch 20 for obtaining the same regeneration amount. Accordingly, the increase/decrease of the regenerative brake force can be easily controlled with the smaller number of times of operation on the shift lever 16A. Thus, the shift lever 16A is suitable for reducing an operation burden on the driver. On the contrary, the number of times of shift operation in the pattern 1 performed by the paddle switch 20 is set to be larger than that in a pattern performed by the shift lever 16A. Accordingly, the paddle switch 20 is suitable for fine control of the regenerative brake force.

In the pattern 2 (third regeneration pattern) performed by the paddle switch 20, the current regeneration stage is automatically changed to a target regeneration stage. Accordingly, in comparison with the case where the regeneration stage is changed one by one whenever an operation is performed as in the pattern 1, the time taken to obtain a deceleration feeling corresponding to a regeneration amount requested by the driver can be shortened so that operability and drivability can be improved. In addition, the paddle switch 20 can be operated in the state in which the driver holds the steering wheel 19 in his/her hands. Accordingly, particularly, operability in adjusting a deceleration feeling during cornering in which the steering wheel 19 is operated to make a left or right turn is so excellent that drivability during sporty traveling can be improved.

That is, different regeneration patterns can be changed over from one to another in accordance with different numbers of times of operation and in accordance with different operating systems. Accordingly, the degree of freedom for changing over the regenerative brake force can increase to support various traveling patterns. Therefore, when the predetermined operation different from the normal operation is performed, the regeneration stage can be changed automatically stepwise. Accordingly, the paddle switch 20 does not have to be operated repeatedly whenever the regeneration stage is changed. Thus, the operability can be improved and the drivability can be improved.

Figure 5:
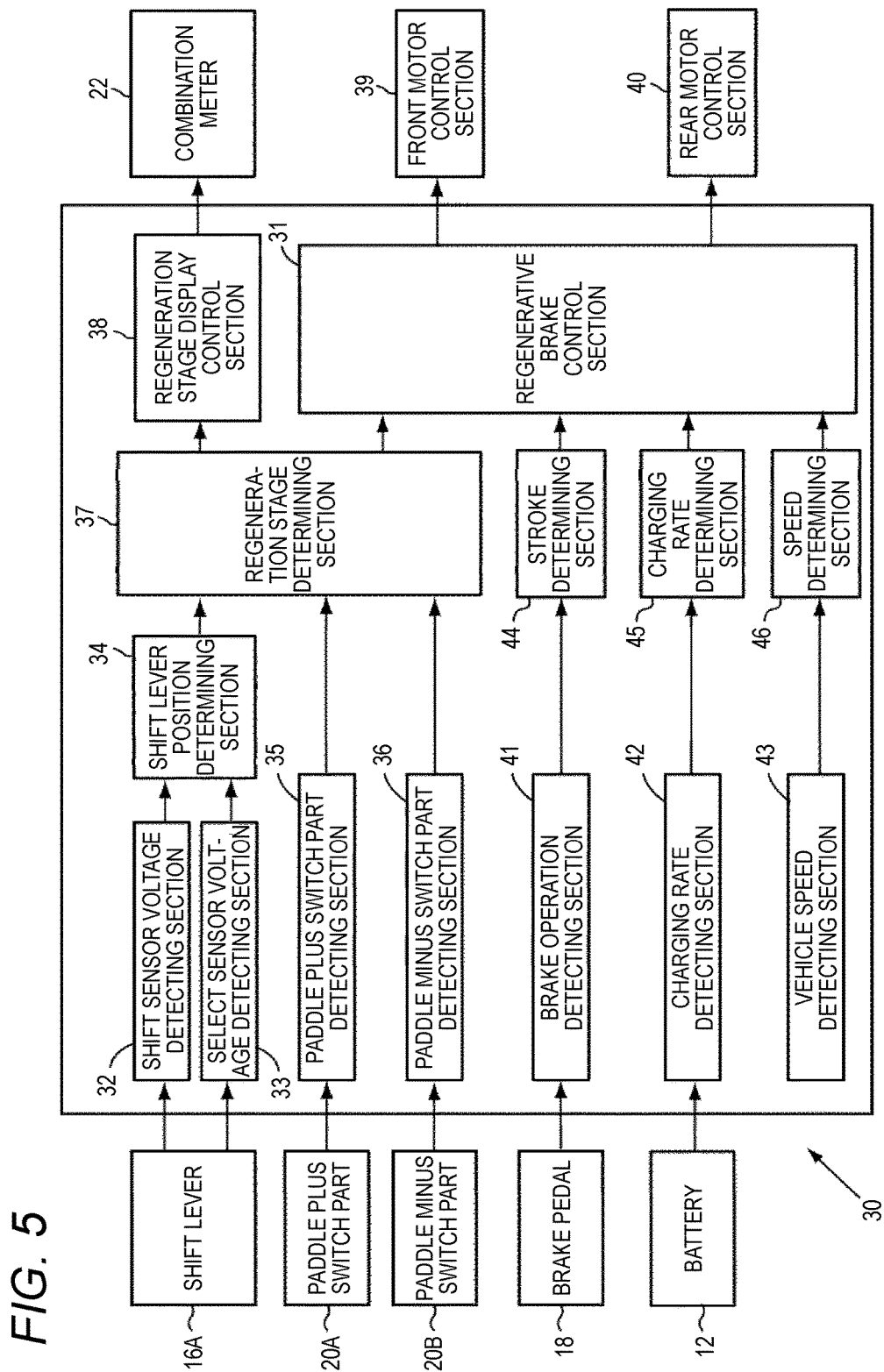
FIG. 5 is a block diagram functionally showing the configuration of the regenerative brake control device mounted in the vehicle.

Control of the regenerative brake force based on such a plurality of regeneration patterns can be carried out by the regenerative brake control device 30 mounted in the vehicle 1. FIG. 5 is a block diagram functionally showing the configuration of the regenerative brake control device 30 mounted in the vehicle 1.

The voltage signals outputted from the shift sensor and the select sensor are detected by a shift sensor voltage detecting section 32 and a select sensor voltage detecting section 33 so that the operation position of the shift level 16A can be determined by a shift lever position determining section 34. Operations on the paddle plus switch part 20A and the paddle minus switch part 20B can be detected by a paddle plus switch part detecting section 35 and a paddle minus switch part detecting section 36 respectively.

A regeneration stage determining section 37 determines the regeneration stage of the regenerative brake force based on respective detection results of the shift lever position determining section 34, the paddle plus switch part detecting section 35 and the paddle minus switch part detecting section 36. Specifically, the regeneration stage (regeneration pattern) to be changed over is determined with reference to the initial regeneration stage (B) of the regenerative brake force and in accordance with the number of times of operation on the shift lever 16A to the B position and the number of times of operation or the predetermined operation on either of the paddle plus switch part 20A and the paddle minus switch part 20B.

When the regeneration stage of the regenerative brake force is determined by the regeneration stage determining section 37, a regeneration stage display control section 38 displays the determined regeneration stage on a combination meter 22 in order to inform the driver. A regenerative brake control section 31 serving as a control section operates the front motor 11A and the rear motor 11B through a front motor control section 39 and a rear motor control section 40 to control the regenerative brake force to be the regeneration stage determined by the regeneration stage determining section 37.

The regenerative brake control device 30 is provided with a brake operation detecting section 41, a charging rate detecting section 42, and a vehicle speed detecting section 43. The brake operation detecting section 41 detects operation of the brake pedal 18. The charging rate detecting section 42 detects a charging rate A of the battery 12. The vehicle speed detecting section 43 detects vehicle speed (V) as the speed of the vehicle 1.

The regenerative brake control device 30 is provided with a stroke determining section 44, a charging rate determining section 45, and a vehicle speed determining section 46. The stroke determining section 44 detects an operation state such as a pressing amount or pressing speed of the brake pedal 18 from an electric signal outputted from the brake operation detecting section 41, and outputs the detected operation state to the regenerative brake control section 31. In the embodiment, assume that the stroke determining section 44 detects a brake stroke S which is the pressing amount. The charging rate determining section 45 determines whether the current charging rate A of the battery 12 is at least equal to a charging reference value A1 or not, based on the current charging rate A which is outputted from the charging rate detecting section 42 and the charging reference value A1. The charging reference value A1 is a predetermined value of the charging rate which has been set preliminarily. The vehicle speed determining section 46 determines whether the current vehicle speed V is at most equal to a predetermined speed V1 which has been set preliminarily or not, based on the vehicle speed V detected by the vehicle speed detecting section 43 and the predetermined speed V1.

The regenerative brake control section 31 makes control to change the automatic stage change speed during regeneration in accordance with a determination result of the stroke determining section 44, a determination result of the charging rate determining section 45 and a determination result of the vehicle speed determining section 46. Here, three determination results, that is, the determination result of the stroke determining section 44, the determination result of the charging rate determining section 45 and the determination result of the vehicle speed determining section 46 are used as control parameters of the automatic stage change speed. However, at least one of the aforementioned three determination results may be used as a control parameter of the automatic stage change speed.

Assume that it is detected by the brake operation detecting section 41 that the brake pedal 18 is pressed, it is determined by the stroke determining section 44 that the pressing amount of the brake pedal 18 is larger than a predetermined stroke, and the double-click operation is then performed on the paddle switch 20. In this case, the regenerative brake control section 31 makes control to increase the automatic stage change speed of the regeneration stage. The case in which the pressing amount of the brake pedal 18 is larger is regarded as the driver's intention of decelerating or stopping the vehicle. Accordingly, by this control, the current regeneration stage is changed automatically in a direction of increasing the regenerative brake force while the automatic stage change speed is increased.

When the double-click operation is performed on the paddle switch 20, the regenerative brake control section 31 makes control to increase the automatic stage change speed of the regeneration stage as the vehicle speed V detected by the vehicle speed detecting section 43 is lower than the predetermined vehicle speed V1. The decrease of the vehicle speed V is regarded as the driver's intention of decelerating or stopping the vehicle. Accordingly, by this control, the current regeneration stage is changed automatically in the direction of increasing the regenerative brake force as the vehicle speed decreases, while the automatic stage change speed is increased.

When the charging rate A detected by the charging rate detecting section 42 is higher than the charging reference value A1 and the double-click operation is performed on the paddle switch 20, the regenerative brake control section 31 makes control to reduce the automatic stage change speed of the regeneration stage. When the charging rate A of the battery 12 is higher than the charging reference value A1, the battery 12 should be prevented from being charged in order to avoid overcharge even if the motors 11 generate electric power. Therefore, the charging reference value A1 is a value lower than the charging rate 100%.

Figure 6:
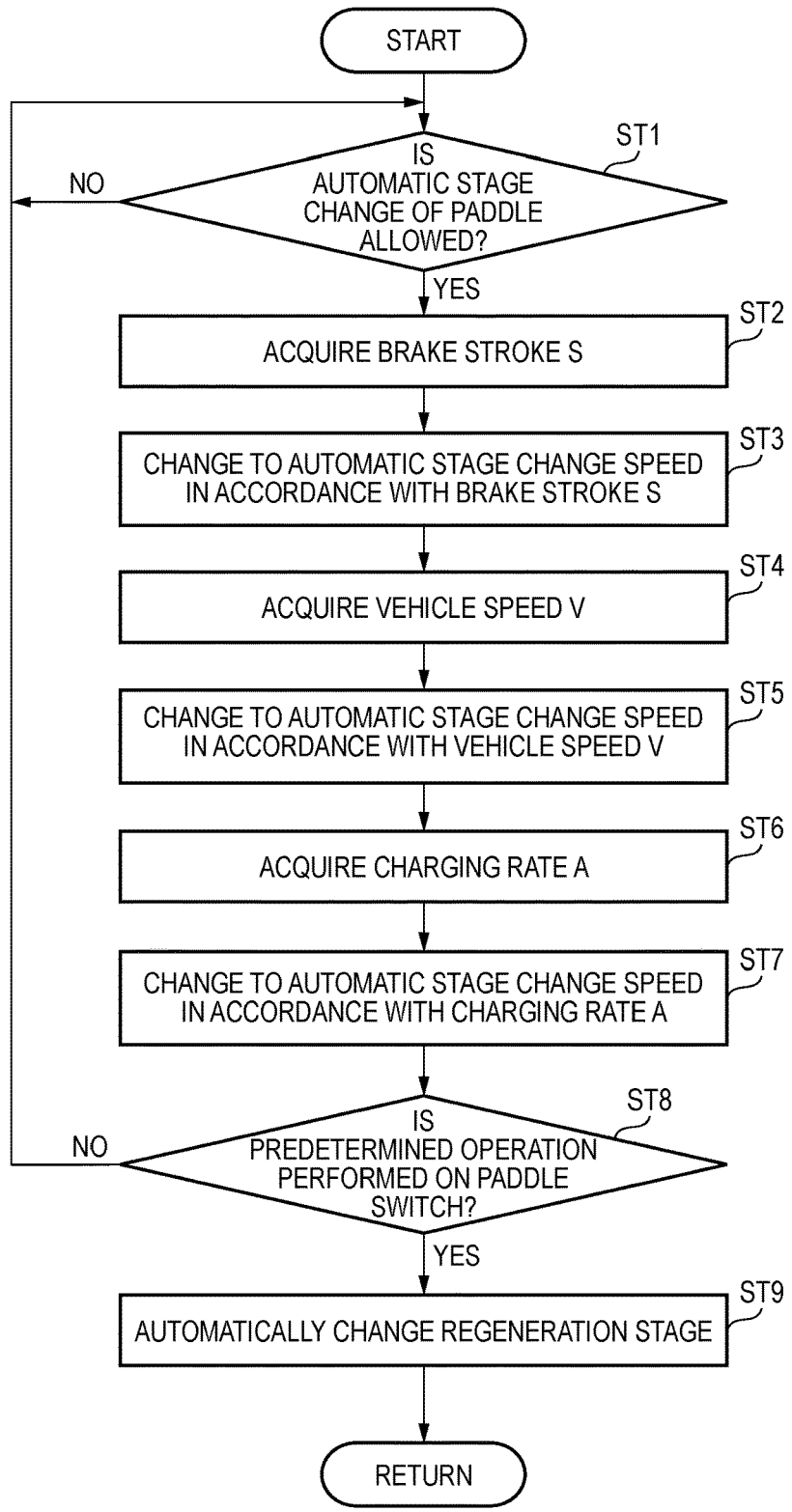
FIG. 6 is a flow chart showing a mode of regeneration processing of the regenerative brake control device.

Control of the automatic stage change speed executed by the regenerative brake control device 30 will be described below in accordance with a flow chart shown in FIG. 6. In the embodiment, assume that the vehicle 1 is already traveling forward in the D range due to driving of the motors 11.

In a step ST1, the regenerative brake control device 30 determines whether automatic stage change of the paddle can be used or not, that is, whether automatic stage change is allowed or not. When, for example, the case where the charging rate A of the battery 12 is 100% is set as a regenerative brake prohibiting condition, the aforementioned determination is made based on the charging rate A from the charging rate detecting section 42. When another condition is set as the regenerative brake prohibiting condition, the determination may be made after the other condition is read.

When the automatic stage change is allowed, the regenerative brake control device 30 goes to a step ST2 in which a brake stroke S is acquired from the stroke determining section 44. Then, the regenerative brake condition device 30 goes to a step ST3. In the step ST3, the regenerative brake control device 30 changes the automatic stage change speed of the regeneration stage in accordance with the brake stroke S and stores the changed information into a memory in advance.

The regenerative brake control device 30 acquires speed information (vehicle speed V) from the vehicle speed detecting section 43 to acquire a speed determination value determined by the vehicle speed determining section 46 in a step ST4. Then, the regenerative brake condition device 30 goes to a step ST5.

In the step ST5, the regenerative brake control device 30 changes the automatic stage change speed of the regeneration stage in accordance with the vehicle speed V and stores the changed information in the memory in advance.

The regenerative brake control device 30 acquires charging information of the battery 12 from the charging rate detecting section 42 to acquire a charging rate A determined by the charging rate determining section 45 in a step ST6.

Then, the regenerative brake condition device 30 goes to a step ST7. In the step ST7, the regenerative brake control device 30 changes the automatic stage change speed of the regeneration stage in accordance with the charging rate A and stores the changed information in the memory in advance.

In a step ST8, the regenerative brake control device 30 determines whether a double-click operation which is a predetermined operation is performed by the paddle switch 20 or not, based on a detection value of the paddle plus switch part detecting section 35 or the paddle minus switch part detecting section 36. When the double-click operation is performed, the regenerative brake control device 30 goes to a step ST9 in which the regenerative brake control device 30 controls operations of the front motor 11A and the rear motor 11B through the front motor control section 39 and the rear motor control section 40 so as to change the regeneration stage automatically at the automatic stage change speed in the pattern 2 in accordance with the pieces of the changed information of the automatic stage change stored in the memory in the steps ST3, ST5 and ST7.

Thus, when the double-click operation is performed on the paddle switch 20 to change the current regeneration stage to a target regeneration stage automatically, the automatic stage change speed is changed in accordance with the state of the vehicle 1. Thus, it is possible to obtain regenerative brake force according to the state of the vehicle 1 while improving operability. Accordingly, it is possible to further improve drivability.

Particularly, in the embodiment, when the pressing amount of the brake pedal 18 is larger, the current regeneration stage is changed automatically in the direction of increasing the regenerative brake force, and the automatic stage change speed is increased. Thus, it is possible to achieve a deceleration feeling requested by the driver more quickly so that it is possible to improve drivability.

As the vehicle speed V decreases, the regenerative brake control section 31 changes the automatic stage change speed of the current regeneration stage automatically in the direction of increasing the regenerative brake force, and increases the automatic stage change speed. Thus, it is possible to achieve a deceleration feeling requested by the driver more quickly so that it is possible to improve drivability.

When the charging rate A is higher than the charging reference value A1, the regenerative brake control section 31 changes the automatic stage change speed of the current regeneration stage automatically in the direction of decreasing the regenerative brake force, and reduces the automatic stage change speed of the regeneration stage. Thus, it is possible to reduce a regeneration amount and prevent the battery 12 from being overcharged in a charging rate region in which the battery 12 is almost fully charged.

In the embodiment, when the regenerative brake prohibiting conditions are established, the regeneration mode is cancelled and the vehicle turns into a D range traveling state. Accordingly, it is possible to reduce change of a deceleration feeling due to sudden cancellation of the regeneration mode to improve drivability in the region in which the charging rate is not lower than a predetermined charging rate as one of the regenerative brake prohibiting conditions.

In the embodiment, the state of the vehicle 1 is detected before the double-click operation is performed on the paddle switch 20. As soon as the double-click operation is performed, the driving motors 11 are controlled to automatically change the regenerative brake force. Accordingly, responsiveness until a deceleration feeling can be obtained from the paddle switch 20 is so excellent that the drivability can be further improved. However, when it is unnecessary to improve the control cycle, such as when the vehicle 1 is traveling at high speed, the state of the vehicle 1 may be detected after the double-click operation is performed. In this manner, the automatic stage change speed of the regeneration stage can be controlled in accordance with the detection result.

In the embodiment, control is made so that the automatic stage change speed is increased as the stroke amount of the brake pedal 18 increases. However, control may be made so that the automatic stage change speed is increased as the pressing speed of the brake pedal 18 increases. When control is made in such a mode, the regenerative brake force can be enhanced quickly in a situation that the driver presses the brake pedal 18 in a hurry. Accordingly, drivability can be improved.

Alternatively, presence/absence of the pressing operation on the brake pedal 18 may be detected by the brake operation detecting section 41. The case in which the brake pedal 18 is pressed is regarded as the driver's intention of decelerating or stopping the vehicle. The automatic stage change speed may be increased to automatically change the current regeneration stage to the target regeneration stage in the direction of increasing the regenerative brake force.

In the embodiment, the paddle switch 20 is illustrated as a selecting section for automatically changing the regeneration stage. However, the selecting section is not limited thereto. In the embodiment, when the shift lever 16A is operated to the B position, the regeneration mode is changed over to the first regeneration pattern. However, a predetermined operation may be defined as a gear shift operation in which the shift lever 16A is moved to the B position is performed on the shift lever 16A a number of times, for example, twice continuously, within a predetermined time. When the predetermined operation is performed, the current regeneration stage may be changed automatically toward a target regeneration stage.

Figure 7:
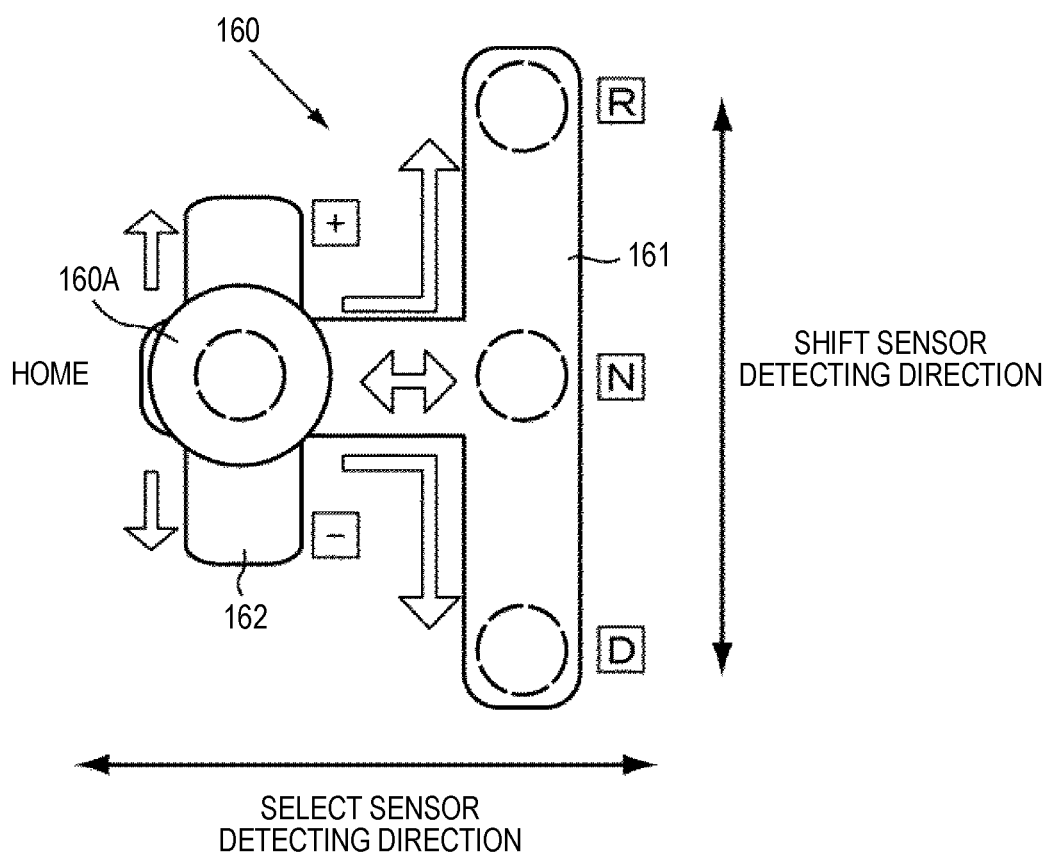
FIG. 7 is a schematic diagram in which a peripheral configuration of a selecting section according to another embodiment according to the invention is shown from right above.

Alternatively, a shift device 160 may be provided as the shift device. In the shift device 160, as shown in FIG. 7, a shift lever 160A is moved on a shift lane 162 different from a shift lane 161 including a D range, and a gear shift operation is performed on the shift lever 160A in a front/rear direction to shift the gear when the vehicle is traveling in the D range. In the case where such a shift device 160 is applied to a vehicle 1, configuration may be made to change a regeneration stage when the gear shift operation is performed on the shift lever 160A on the shift lane 162.

When, for example, a normal regeneration ratio changing operation for operating the shift lever 160A once on the shift lane 162 in a plus direction is performed in this case, the regeneration stage is changed one by one in a direction of decreasing regenerative brake force. When, for example, a normal regeneration ratio changing operation for operating the shift lever 160A once on the shift lane 162 in a minus direction is performed in this case, the regeneration stage is changed one by one in a direction of increasing the regenerative brake force. That is, a pattern 1 of a second regeneration pattern can be performed.

When the shift lever 160A is operated in the plus direction a number of times within a predetermined time on the shift lane 162, the current regeneration stage is changed automatically toward a target regeneration stage in the direction of decreasing the regenerative brake force. In addition, when the shift lever 160A is operated in the minus direction a number of times within the predetermined time, the current regeneration stage is changed automatically toward a target regeneration stage in the direction of increasing the regenerative brake force. That is, a pattern 2 of the second regeneration pattern can be performed.

Assume that a predetermined operation different from the normal regeneration ratio changing operation is performed even when the shift device 160 configured thus is used as the selecting section. In this case, the regeneration stage is changed automatically stepwise. Accordingly, the paddle switch 20 does not have to be operated repeatedly whenever the regeneration stage is changed. Thus, it is possible to improve operability and improve drivability.

To cancel the control of the automatic stage change speed, for example, the shift lever 160A may be operated to be returned to the shift lane 161 where the D range is located.

When the automatic stage change speed of the regeneration stage is changed in the direction of increasing the regenerative brake force, it is desirable that the automatic stage change can be made faster because the driver wants to effectuate the brake force more quickly or wants a deceleration feeling more quickly. However, when the automatic stage change speed of the regeneration stage is changed in the direction of decreasing the regenerative brake force, the brake force is released. Accordingly, it is almost unnecessary to quicken the automatic stage change speed but control may be made to quicken the automatic stage change speed.

Although the embodiments have been described in the case where the electrically driven vehicle 1 having the motors 11 which are rotary electric motors serving as traveling power sources is used as an example, the vehicle 1 is not limited thereto. For example, a hybrid type electric vehicle provided with rotary electric motors and an internal-combustion engine may be used alternatively. Although four-wheel drive is used as the drive system of the vehicle 1 by way of example, two-wheel drive may be used alternatively. Any of a series hybrid system, a parallel hybrid system, a series-parallel hybrid system, and a power split system may be used as the hybrid type mode.

According to an aspect of the invention, when the predetermined operation is performed on the selecting section, the current regeneration stage is automatically changed to a target regeneration stage to thereby change a regeneration ratio. Accordingly, an operation time taken to obtain a deceleration feeling corresponding to a regeneration amount requested by a driver can be shortened. Operability in adjusting the regeneration amount can be improved so that drivability can be improved.

What is claimed is:

1. A regenerative brake control device of a vehicle that controls a rotary electric motor driven by wheels to generate a selected regenerative brake force among a plurality of regenerative braking forces, the regenerative brake control device comprising:
   a selecting section which is manually operated to select a regeneration force among the plurality of regeneration forces; and
   a control section that determines whether a predetermined operation is performed on the selecting section, and, when the predetermined operation is determined to be performed, automatically changes the regenerative braking force among the plurality of regenerative braking forces without further operation of the selecting section.

2. The regenerative brake control device according to claim 1, wherein
   the control section automatically changes the regenerative braking force toward one of a maximum regeneration braking force and a minimum regeneration braking force.

3. The regenerative brake control device according to claim 2, wherein
the control section changes a speed at which the regeneration braking force is automatically changed in accordance with at least one of a driver's intention to decelerate the vehicle, a vehicle speed, and a charging rate of a battery that drives the rotary electric motor.

4. The regenerative brake control device according to claim 3, further comprising:
a brake state detecting section that detects an operation state of a brake section configured to generate a brake force in the vehicle, wherein
the control section increases the speed at which the regenerative braking force is automatically changed as the generated braking force increases.

5. The regenerative brake control device according to claim 4, wherein
the brake state detecting section detects at least one of a pressing operation of a brake pedal provided in the brake section, a pressing speed of the brake pedal, and a pressing amount of the brake pedal.

6. The regenerative brake control device according to claim 3, further comprising:
a vehicle speed detecting section that detects a speed of the vehicle, wherein
the control section increases a speed at which the regenerative braking force is automatically changed as the detected speed of the vehicle decreases.

7. The regenerative brake control device according to claim 3, further comprising:
a charging rate detecting section that detects a charging rate of a battery configured to supply an electric power to the rotary electric motor, wherein
the control section decreases a speed at which the regenerative braking force is automatically changed when the detected charging rate of the battery is higher than a predetermined charging value.

8. The regenerative brake control device according to claim 3, wherein,
when an operation different from the predetermined operation is performed on the selecting section after the predetermined operation is performed on the selecting section, the control section cancels changing of the speed at which the regeneration braking force is automatically changed.

9. The regenerative brake control device according to claim 2, wherein
the predetermined operation is an operation performed on the selecting section continuously a number of times within a predetermined period of time.

10. The regenerative brake control device according to claim 1, wherein
the control section changes a speed at which the regeneration braking force is automatically changed in accordance with at least one of a driver's intention to decelerate the vehicle, a vehicle speed, and a charging rate of a battery that drives the rotary electric motor.

11. The regenerative brake control device according to claim 10, further comprising:
a brake state detecting section that detects an operation state of a brake section configured to generate a brake force in the vehicle, wherein
the control section increases the speed at which the regenerative braking force is automatically changed as the generated braking force increases.

12. The regenerative brake control device according to claim 11, wherein
the brake state detecting section detects at least one of a pressing operation of a brake pedal provided in the brake section, a pressing speed of the brake pedal, and a pressing amount of the brake pedal.

13. The regenerative brake control device according to claim 10, further comprising:
a vehicle speed detecting section that detects a speed of the vehicle, wherein
the control section increases a speed at which the regenerative braking force is automatically changed as the detected speed of the vehicle decreases.

14. The regenerative brake control device according to claim 10, further comprising:
a charging rate detecting section that detects a charging rate of a battery configured to supply an electric power to the rotary electric motor, wherein
the control section decreases a speed at which the regenerative braking force is automatically changed when the detected charging rate of the battery is higher than a predetermined charging value.

15. The regenerative brake control device according to claim 10, wherein,
when an operation different from the predetermined operation is performed on the selecting section after the predetermined operation is performed on the selecting section, the control section cancels changing of the speed at which the regeneration braking force is automatically changed.

16. The regenerative brake control device according to claim 1, wherein
the predetermined operation is an operation performed on the selecting section continuously a number of times within a predetermined period of time.

17. The regenerative brake control device according to claim 1, wherein,
when an operation different from the predetermined operation is performed on the selecting section, the control section increases or decreases the regenerative braking force by a single step every time the operation different from the predetermined operation is performed, and
when the predetermined operation is performed on the selecting section, the control section automatically changes the regenerative braking force to a target regenerative force.

18. The regenerative brake control device according to claim 17, wherein
the operation different from the predetermined operation is an operation performed on the selecting section one time within a predetermined period of time, and
the predetermined operation is an operation performed on the selecting section continuously a number of times within the predetermined period of time.

19. The regenerative brake control device according to claim 17, wherein
the target regenerative force is one of a maximum regenerative force and a minimum regenerative force among the plurality of regenerative forces.

* * * * *